United States Patent
Healy et al.

(10) Patent No.: US 11,755,734 B2
(45) Date of Patent: Sep. 12, 2023

(54) ANALYSIS PRIORITY OF OBJECTS FROM CROSS-SECTIONAL VARIANCE

(71) Applicant: McAfee, LLC, San Jose, CA (US)

(72) Inventors: Sorcha Bairbre Healy, County Cork (IE); Gerard Donal Murphy, County Cork (IE); Steven Grobman, Flower Mound, TX (US)

(73) Assignee: McAfee, LLC, San Jose, CA (US)

( * ) Notice: Subject to any disclaimer, the term of this patent is extended or adjusted under 35 U.S.C. 154(b) by 720 days.

(21) Appl. No.: 16/588,391

(22) Filed: Sep. 30, 2019

(65) Prior Publication Data

US 2021/0097334 A1 Apr. 1, 2021

(51) Int. Cl.
*G06F 21/00* (2013.01)
*G06F 21/56* (2013.01)
(Continued)

(52) U.S. Cl.
CPC .......... *G06F 21/566* (2013.01); *G06F 18/213* (2023.01); *G06F 18/23* (2023.01);
(Continued)

(58) Field of Classification Search
CPC .... G06K 9/6218; G06K 9/6232; G06F 21/56; G06F 21/566; G06N 5/003; G06N 20/00; G06N 20/20
See application file for complete search history.

(56) References Cited

U.S. PATENT DOCUMENTS 8,484,132 B1 7/2013 Christiansen et al.
9,430,646 B1 * 8/2016 Mushtaq ................. H04L 67/02
(Continued)

FOREIGN PATENT DOCUMENTS

CN 110730156 A * 1/2020 ............. G06F 17/15

OTHER PUBLICATIONS

Van Der Walt, S, et al., "The NumPy Array: A Structure for Efficient Numerical Computation", Comput. Sci. Eng., vol. 13, No. 2, (Mar. 2011), 22-30. (Year: 2011).*
(Continued)

*Primary Examiner* — Don G Zhao
(74) *Attorney, Agent, or Firm* — Patent Capital Group

(57) ABSTRACT

There is disclosed in one example a computing apparatus, including: a processor and a memory; a data store having stored thereon trained models $M_{GLOBAL}$ and $M_{ENT}$, wherein model $M_{GLOBAL}$ includes a clustering model of proximity and prevalence of a first body of computing objects, and $M_{ENT}$ includes a clustering model of proximity and prevalence of a second body of computing object; and instructions encoded within the memory to instruct the processor to: receive an object under analysis; apply a machine learning model to compute a global variance score between the object under analysis and $M_{GLOBAL}$; apply the machine learning model to compute an enterprise variance score between the object under analysis and $M_{ENT}$; compute from the global variance score and the enterprise variance score a cross-sectional variance score; and assign the object under analysis an analysis priority according to the cross-sectional variance score.

20 Claims, 13 Drawing Sheets

(51) Int. Cl.
*G06N 20/00* (2019.01)
*G06F 18/23* (2023.01)
*G06F 18/213* (2023.01)
*G06N 5/01* (2023.01)

(52) U.S. Cl.
CPC ............... *G06F 21/56* (2013.01); *G06N 5/01* (2023.01); *G06N 20/00* (2019.01)

(56) References Cited

U.S. PATENT DOCUMENTS

| | | | |
|---|---|---|---|
| 9,824,216 B1* | 11/2017 | Khalid | G06F 21/554 |
| 9,825,976 B1* | 11/2017 | Gomez | H04L 63/1416 |
| 9,998,480 B1* | 6/2018 | Gates | G06F 21/577 |
| 10,264,440 B2* | 4/2019 | Dishon | H04K 3/822 |
| 10,295,593 B2* | 5/2019 | Shake | G06F 11/3058 |
| 10,404,745 B2* | 9/2019 | Verma | G06N 20/00 |
| 10,726,356 B1* | 7/2020 | Zarandioon | G06N 7/005 |
| 10,880,322 B1* | 12/2020 | Jakobsson | H04L 51/08 |
| 11,195,113 B2* | 12/2021 | Srivastava | G06Q 10/06375 |
| 11,233,815 B1* | 1/2022 | Rose | H04L 45/42 |
| 11,310,268 B2* | 4/2022 | Bowditch | G06K 9/6267 |
| 2015/0128263 A1 | 5/2015 | Raugas et al. | |
| 2016/0344770 A1* | 11/2016 | Verma | G06N 20/00 |
| 2017/0359368 A1* | 12/2017 | Hodgman | H04L 63/145 |
| 2018/0063250 A1* | 3/2018 | Justin | G06F 11/3414 |
| 2018/0150758 A1* | 5/2018 | Niininen | G06N 20/00 |
| 2018/0173372 A1* | 6/2018 | Greenspan | G06T 11/206 |
| 2019/0122073 A1* | 4/2019 | Ozdemir | A61B 5/7267 |
| 2019/0130303 A1* | 5/2019 | Bigaj | G06N 20/00 |
| 2019/0132343 A1 | 5/2019 | Chen et al. | |
| 2019/0155695 A1 | 5/2019 | Protasov et al. | |
| 2019/0166144 A1* | 5/2019 | Mirsky | H04L 63/1425 |
| 2019/0215329 A1 | 7/2019 | Levy | |
| 2019/0251258 A1* | 8/2019 | Walters | G06F 21/54 |
| 2019/0319945 A1* | 10/2019 | Levy | G06N 5/046 |
| 2020/0067969 A1* | 2/2020 | Abbaszadeh | G06K 9/6269 |
| 2020/0358819 A1* | 11/2020 | Bowditch | G06N 20/10 |
| 2020/0358820 A1* | 11/2020 | Kolingivadi | H04L 63/1425 |
| 2020/0366712 A1* | 11/2020 | Onut | H04L 63/1483 |
| 2020/0396230 A1* | 12/2020 | Liu | H04L 63/1441 |
| 2021/0279337 A1* | 9/2021 | Mosby | G06N 20/00 |
| 2021/0295177 A1* | 9/2021 | Joshi | G06N 5/025 |
| 2021/0406613 A1* | 12/2021 | More | G06K 9/6267 |

OTHER PUBLICATIONS

F. Dubosson, S. Bromuri and M. Schumacher, "A Python Framework for Exhaustive Machine Learning Algorithms and Features Evaluations," 2016 IEEE 30th International Conference on Advanced Information Networking and Applications (AINA), 2016, pp. 987-993, doi: 10.1109/AINA.2016.160. (Year: 2016).*

Bowen, Sun, et al., "Malware Family Classification Method Based on Static Feature Extraction," 2017 3rd IEEE International Conference on Computer and Communications, Chengdu, China, Dec. 13-16, 2017; 7 pages.

Hariri, Sahand, et al., "Extended Isolation Forest," arXiv:1811.02141v1 [cs.LG] Nov. 6, 2018; 11 pages.

* cited by examiner

ANALYSIS PRIORITY OF OBJECTS FROM CROSS-SECTIONAL VARIANCE

FIELD OF THE SPECIFICATION

This application relates in general to computer security, and more particularly, though not exclusively, to a system and method for providing analysis priority of objects from cross-sectional variance.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
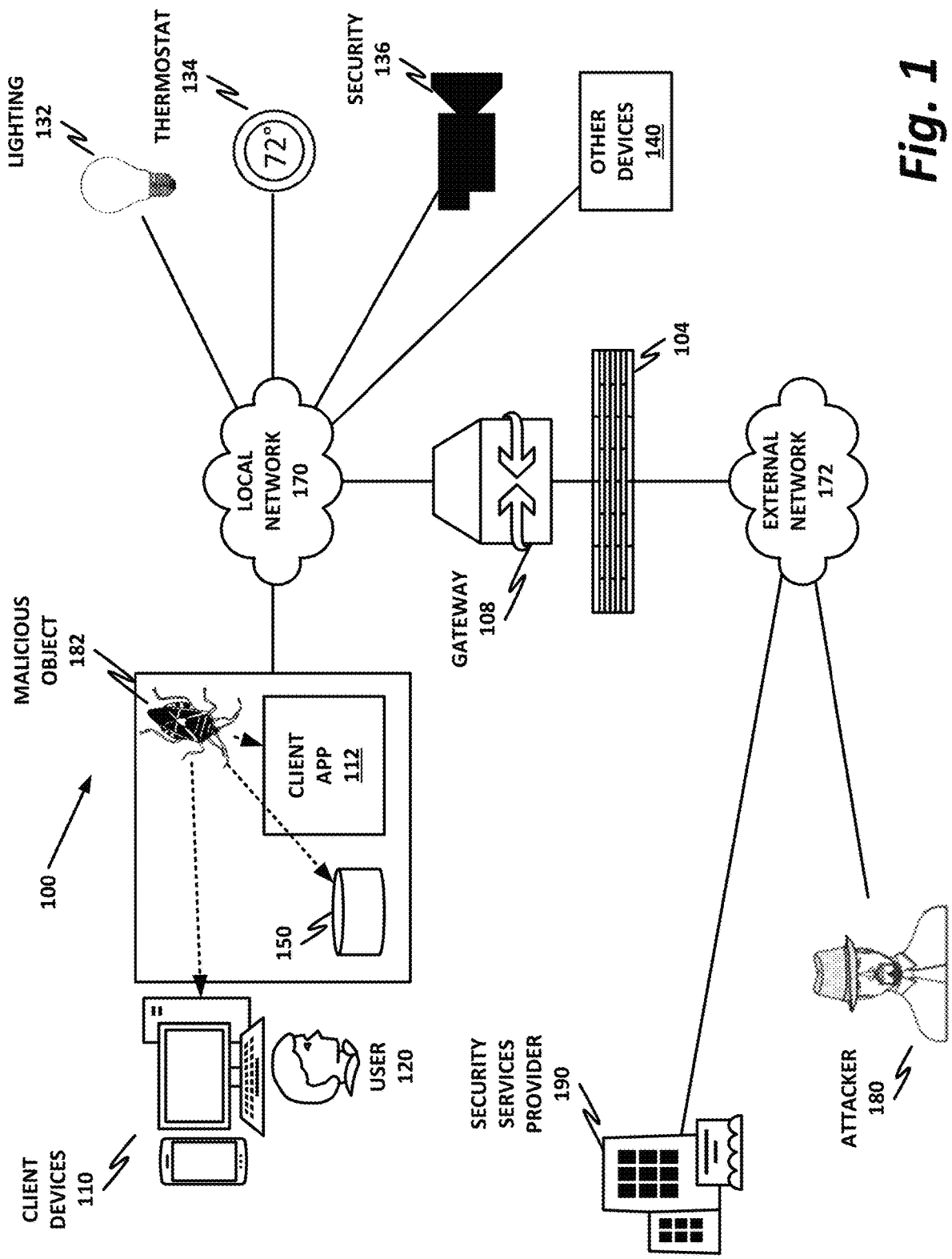
FIG. 1 is a block diagram of selected elements of a security ecosystem.

In an example, there is disclosed a computing apparatus, comprising: a processor and a memory; a data store having stored thereon trained models $M_{GLOBAL}$ and $M_{ENT}$, wherein model $M_{GLOBAL}$ comprises a clustering model of proximity and prevalence of a first body of computing objects, and $M_{ENT}$ comprises a clustering model of proximity and prevalence of a second body of computing object; and instructions encoded within the memory to instruct the processor to: receive an object under analysis; apply a machine learning model to compute a global variance score between the object under analysis and $M_{GLOBAL}$; apply the machine learning model to compute an enterprise variance score between the object under analysis and $M_{ENT}$; compute from the global variance score and the enterprise variance score a cross-sectional variance score; and assign the object under analysis an analysis priority according to the cross-sectional variance score.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Antivirus and anti-malware scanners have become very effective at identifying traditional malware. Such scanners have gone beyond the use of simple signatures, and use more sophisticated methods such as fuzzy hashing, identification of malware families, identification by feature vectors, and other sophisticated approaches. Many of these approaches are based on the principle that different malware objects tend to look and behave similarly. For example, many malware authors rely on common libraries in toolkits to develop their malicious software. Malware scanners are able to identify instances of the use of these toolkits, and to mark the resulting binaries as malicious.

However, many enterprises, including large enterprises, face so-called advanced persistent threats (APTs). APTs are a more sophisticated species of malware. Rather than relying heavily on malware toolkits, APTs may have a substantial amount of customized and targeted code. This heavy customization may serve two purposes. First, the heavy customization may be targeted specifically at a particular enterprise. For example, the malware author identifies an enterprise, gathers as much intelligence as possible about the enterprise, and then authors a malware object intended specifically to exploit that specific enterprise. Second, the customization may help to defeat traditional malware scanners. Because many of the scanners rely on identifying objects that are similar to other objects and classifying them into families, heavily customized malware is more difficult to identify and classify. Authors of APTs may also use other techniques, such as packers that obfuscate the signature of the malware, and measured attacks such as "data diddling." If the malware object installs on the enterprise and immediately begins large-scale and obvious data collection operations, then it may be relatively easy for a malware scanner or a security expert to identify the attack and to mitigate it. However, if the malware is very measured in its data collection and operates in a more conservative manner, then it may be more difficult to identify.

In one well-known example, a large retailer was the subject of an APT attack. The APT object was able to quietly replicate itself across the enterprise network and collect substantial volumes of information, including personal customer data, before the object was identified approximately three weeks later. Because the object had unfettered access to the retailer's enterprise and consumer data for three weeks, the damage done was substantial.

Another issue in security design, particularly with respect to security services vendors and large enterprises that are frequently the targets of malicious actors, is the sheer volume of data collected. While security scanners are very good at identifying malicious objects, a large enterprise may be the subject of numerous attacks, and may thus identify thousands of new incoming malicious or suspicious objects in a day. These new, incoming objects may be the subject of additional deep static analysis, sandboxing, dynamic analysis, and analysis by human security experts. However, the sheer volume of these incoming objects can cause challenges in triaging or prioritizing which objects should first receive the most intense scrutiny. In the example described above, the APT object may have been first identified as unknown and/or suspicious days or weeks before the attack was finally mitigated. However, because the enterprise has many thousands of such objects that need to be analyzed and tested, the true nature of the attack was not known for some time. It is therefore advantageous to triage incoming objects to determine which suspicious objects should be first subjected to the most serious scrutiny.

A primary feature of an APT, which in one example is delivered as a fileless attack or as a portable executable, is its very uniqueness. The uniqueness of the object is, in fact, by design of the malware author to target the specific enterprise, and to defeat traditional malware scanners that rely on the similarity of various malicious objects. Thus, this very uniqueness can be used as a factor in triaging unknown objects for analysis. It should be noted that uniqueness, per se, is not necessarily an indication that an unknown object is an APT. For example, a new suspicious object that does not match, or that poorly matches known signatures could, in fact, be something relatively useless. It may represent, for example, the efforts of a bored college student who is dabbling in malware and is not even aware of the availability of numerous, powerful open source malware toolkits. Such a malware attack could be a naïve attack that uses only some of the best-known and fundamental security exploits, and that actually represents a very minimal threat to the enterprise.

On the other hand, a highly unique attack could represent a sophisticated effort by a well-financed foreign government with a large team of skilled programmers making a concerted effort to compromise a very specific enterprise. In that case, the concerted effort of a large team of skilled programmers could represent a very substantial threat to the enterprise, and should be mitigated quickly. A uniqueness analysis by a malware scanner is generally not expected, by itself, to know the difference between a very naïve attack and a highly sophisticated attack. However, once the unique object has been identified as suspicious and triaged for further analysis, a more sophisticated deep static analysis, machine learning analysis, and/or analysis by human security experts should be able to quickly differentiate the naïve hobbyist from the sophisticated, well-funded attack.

Embodiments of the present specification may include both a global and enterprise variance engine.

The global variance engine can observe a suspicious object, and using existing feature vector analysis, determine how unique the object is from a global perspective. The enterprise variance engine can determine how unique the object is from an enterprise perspective. The intersection of is from a global perspective. The enterprise variance engine can determine how unique the object is from an enterprise perspective. The intersection of global and enterprise uniqueness can then be used to determine whether a suspicious object possibly represents a targeted attack by an APT.

This intersection of global and enterprise uniqueness accounts for the particular properties of an APT. If a new object has high global uniqueness (e.g., it is new), but quickly shows up over a large cross-section of different enterprises in a short time, it is unlikely to be an APT attack. It may simply be a new malware object that is propagating across the internet and indiscriminately attacking whatever devices it can attach to.

Similarly, if an object has high enterprise uniqueness, but low global uniqueness, then it may simply represent the first few infections within the enterprise from an untargeted or general attack. However, if an object has high global uniqueness and high enterprise uniqueness, then it is much more likely to be a targeted attack at the specific enterprise. Such an object may therefore be prioritized for more in-depth analysis, to determine whether it represents a genuine threat to the enterprise.

In an embodiment, a system and method according to the present specification uses decision tree paths between sets of static features of portable executables, or other executable objects, to establish uniqueness. Other analytical mechanisms may be used to establish similarity and differences, but are less efficient. For example, a full squared correlation matrix or weighted metric becomes an $N^2$ problem, where N is the number of items to consider. When N becomes millions and billions of objects, the full squared correlation matrix can become unworkable and/or inefficient.

Clustering may also be used, but may be afflicted with the "curse of dimensionality." This provides an increasingly large search space of power d, where d is the number of dimensions. In an embodiment, the portable executable static feature vector and/or dynamic feature vector may have hundreds of dimensions.

Clustering gives "buckets of items" that are equally ranked in similarity. These may be scaled to millions of items.

The system and method described herein efficiently establishes the scale of difference on a continuous basis, without being limited by the drawbacks of other types of analytical techniques. Items may be classified as "interesting," and triaged for further analysis using a random forest classifier that uses a labeled data set to determine what is "important."

In operation, a forest of decision tree paths may be established on the data set of static and dynamic feature vectors. This procedure brings like items progressively together. Somewhat counterintuitively, the less alike items have a shorter decision path in the forest/tree than similar items. This continuous scale allows for taking the path along less alike to more alike in an incremental fashion, ranking in priority for novelty of the static or dynamic feature, compared to items already in the training set. This enables progressive investigation of items in a scalable fashion. In some embodiments, a machine learning model may be generated from previous items to establish the scale without having to explicitly compare each individual previous value of the static feature vector.

This approach realizes advantages over some other approaches. For example, the method scales efficiently for an increasing N number of items. It also scales efficiently for d increasing dimensions. It is parallelizable in training and prediction, and may provide real-time ranking. It can also be used in multiprocessing, and with methods such as Spark.

The method described herein does not necessarily require human generated labels to provide analytical value to researchers or customers. It may instead provide a continuous scale ranking distance from uncommon items (e.g., outliers) to more common items (nominals), rather than clusters of items that are the same. Furthermore, the method described herein does not require an a priori metric or weighted metric/distance measure to be defined on the static feature vector beforehand.

In certain embodiments, the system described herein uses the Hariri isolation forest for anomaly detection.

The Hariri isolation forest was initially developed to classify large astronomical structures. The intent was to quickly isolate structures that were few and different. Although Hariri was originally intended for astronomy, is recognized herein that a similar approach can be used for identifying objects in an enterprise, with individual objects functioning similar to astronomical structures (e.g., stars) in an astronomical data set.

The method described herein achieves certain advantages. For example, the method may be used in a distributed (e.g., Spark) framework because of the intrinsic parallel capability of the algorithm. The algorithm may be combined with open source components, which can provide cost savings and flexibility for system implementers. This system can also be scaled to provide ranking as quickly as required with the allocation of appropriate resources.

The system and method described herein also provides the customer or researcher with a "throttling mechanism" to investigate the most unusual or important items identified globally or within the enterprise. This can prioritize efforts for identifying the most important threats to the enterprise.

Furthermore, the approach described herein is suitable for a windowed live streaming feed of simultaneous outlier identifications.

A system and method for providing analysis priority of objects from cross-sectional variance will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the Internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone Internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Malicious object 182 may be an APT, a fileless attack, a portable executable, or some other attack on the enterprise. Security researchers within the enterprise may need to investigate thousands of such malicious or potentially malicious objects, and thus it is advantageous to be able to prioritize the investigation of objects. For example, if malicious object 182 has a high uniqueness score, both globally and with respect to the enterprise, then it may be prioritized for inspection and analysis.

Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
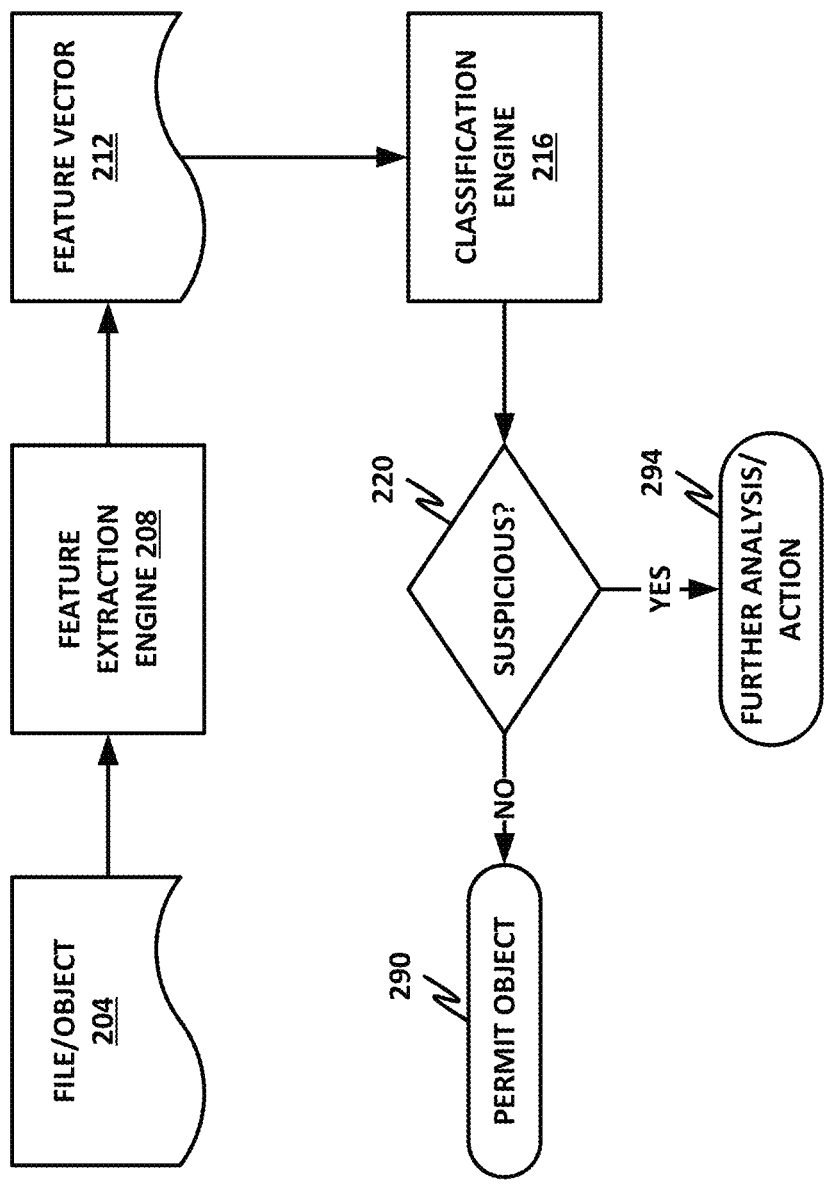
FIG. 2 is a block diagram of selected aspects of a traditional malware analysis.

FIG. 2 is a block diagram of selected aspects of a traditional malware analysis. The workflow of FIG. 2 may be performed for example in an enterprise, or by a security services provider. In one example, the work flow is performed by an enterprise server, such as one existing as a virtual network function (VNF), or as part of a service function chain that utilizes software-defined networking (SDN) to connect VNFs in a virtual chain.

In this example, a new file or object 204 is encountered by the enterprise. The new file or object may not have a known reputation on the enterprise. If object 204 has a known reputation, then the known reputation can simply be applied. For example, if the known reputation is good, the object can simply be permitted to operate on the network according to its intended function. On the other hand, if the object is known to be bad, then it can be blocked by enterprise gateways and other resources before it ever enters the enterprise network. In one example, an enterprise workflow includes a malware scanner that applies known reputations to known objects, including known malicious objects.

Assuming that object 204 does not have a known reputation, and therefore requires additional analysis by the enterprise, a feature extraction engine 208 may analyze object 204 to extract features from the object. Feature extraction engine 208 may extract both static and dynamic features. Many different static and dynamic features are available. In an embodiment, static features include those listed in Table 1 below, by way of illustrative and nonlimiting example.

TABLE 1

Example Static Features for Malware Samples

| | |
|---|---|
| hex_filesize | The size of the file |
| hex_filelines | The number of rows in the byte view of the file |
| hex_str_len | The number of the corresponding length of string in the file |
| hex_1gram | The number of characters in the file |
| hex_entropy | The file's entropy |

TABLE 1-continued

Example Static Features for Malware Samples

| | |
|---|---|
| asm_register | The number of registry keys accessed or modified by the file |
| asm_opcode | The number of opcodes recognized |
| asm_dd | The number of occurrence of the pseudo instruction "dd" |
| asm_dw | The number of occurrence of the pseudo instruction "dw" |
| asm_symbol | The number of special symbols |
| pe_api | The number of suspicious API class |
| pe_dll | The number of dynamic link libraries (DLLs) accessed by the file |
| pe_imports | The number of imports |
| pe_exports | The number of exports |
| pe_mastiff | The information of Mastiff Report |
| pe_alertapi | The statistic number of malicious API |
| pe_compile | The compiling environment of sample |

Hexadecimal Bytecode Features

Bytecode can be observed as a series of hexadecimal character arrangement. It is the original form of malware and shows the fundamental outline of malware. Feature collection can directly read through the hexadecimal bytecode, and feature details are as follows:

File Size: Basic file information including the file size, number of file lines, and total number of file characters.

Visible String: Includes statistics of visible ASCII strings' length, with filters applied to reduce noise.

Program Entropy: The entropy of the program is a measure of the amount of disorder, which is a reflection of whether the malware sample obfuscates itself or makes other changes.

Assembler Code Features

Interactive Disassembler (IDA) is a static disassembly tool that supports multi-platform applications. IDA performs automatic code analysis, using cross-references between code sections, knowledge of parameters of API calls, and other information.

Register Features: The register is an important part of the assembly language, and different compilation environments have great influence on the type of compiler function register. The number of various types of registers may be extracted from the compiler function register.

Operation Code (Opcode): Opcode is a visual representation of the machine code, which is the most frequent element in the assembly language.

Data Definition Features: Considers some statistical information of data definition opcodes orders such as "db", "dd," and "dw." In the analysis of the shelling sample process, these samples are mainly made up of "db", "dd" and "dw" opcodes. Extracting these features may help to classify the shelling samples.

Portable Executable Structure View Feature

In cases where malware is delivered as a portable executable (PE), the PE header contains a large amount of software-related information. Software such as Exeinfo PE and Mastiff may be used to extract features related to the structure of executable objects. Mastiff is an open source command-based static analysis framework developed by the Defense Advanced Research Projects Agency (DARPA). It is mainly used to extract the structured information of PE files, and also supports the development of related plugins to provide static analysis of PDF, Word, and other format files. Exeinfo PE may be used by developers to check the compiler environment and maintain the compiler information database. The batch function provided by Exeinfo PE may be used to check the shelling information contained in malware. The PE structure features and compiler environment features provided by Mastiff and Exeinfo PE may be combined as PE structure view features, as detailed below.

PE Structured Information

The PE header contains a large number of software-related deep-level data, with related semantic information that can be analyzed. Important structural features may be extracted, including the number of API calls, the number of DLL calls, the number of import functions, the number of export functions, the starting virtual address, virtual size, language, and others.

Anti-Detection Features

Mastiff analysis reveals a series of antivirus measures made by malicious samples. Example malicious features include packers, virtual escape techniques, anti-debug techniques, and anti-virtual machine techniques.

Compile Features

The compilation time of the software and the compilation environment may be extracted, as well as shelling information. According to the difference of compiled information, accuracy of the characteristics of the compiler environment may be verified.

Malicious APIs

Researchers have analyzed more than 50 million malicious samples, arriving at the top 500 frequent APIs used by malware objects. In an illustrative example, the first 100 of these are considered, and their frequency is measured as a malicious API feature.

It should be noted that, although static features are disclosed here by way of illustration, dynamic features may also be used. Dynamic features could include, for example, behavioral features. Behavioral features include the behavior of the object while executing. The behavior can be observed and featurized, so that certain behaviors act as individual tokens for analysis.

Feature extraction engine 208 builds a feature vector 212 for object 204. Feature vector 212 includes a list of all the features extracted by feature extraction engine 208.

Feature vector 212 is provided to a classification engine 216. Classification engine 216 can analyze feature vector 212 in comparison to other features, to determine whether object 204 is likely to be malware. Classification engine 216 can thus make a determination based on the extracted features of whether the object is suspicious or not.

At decision block 220, the system determines whether the object is deemed suspicious or not. If the object is not deemed suspicious, then the object may simply be permitted at block 290. If the object is deemed suspicious, then at block 294, further analysis may be required.

Figure 3:
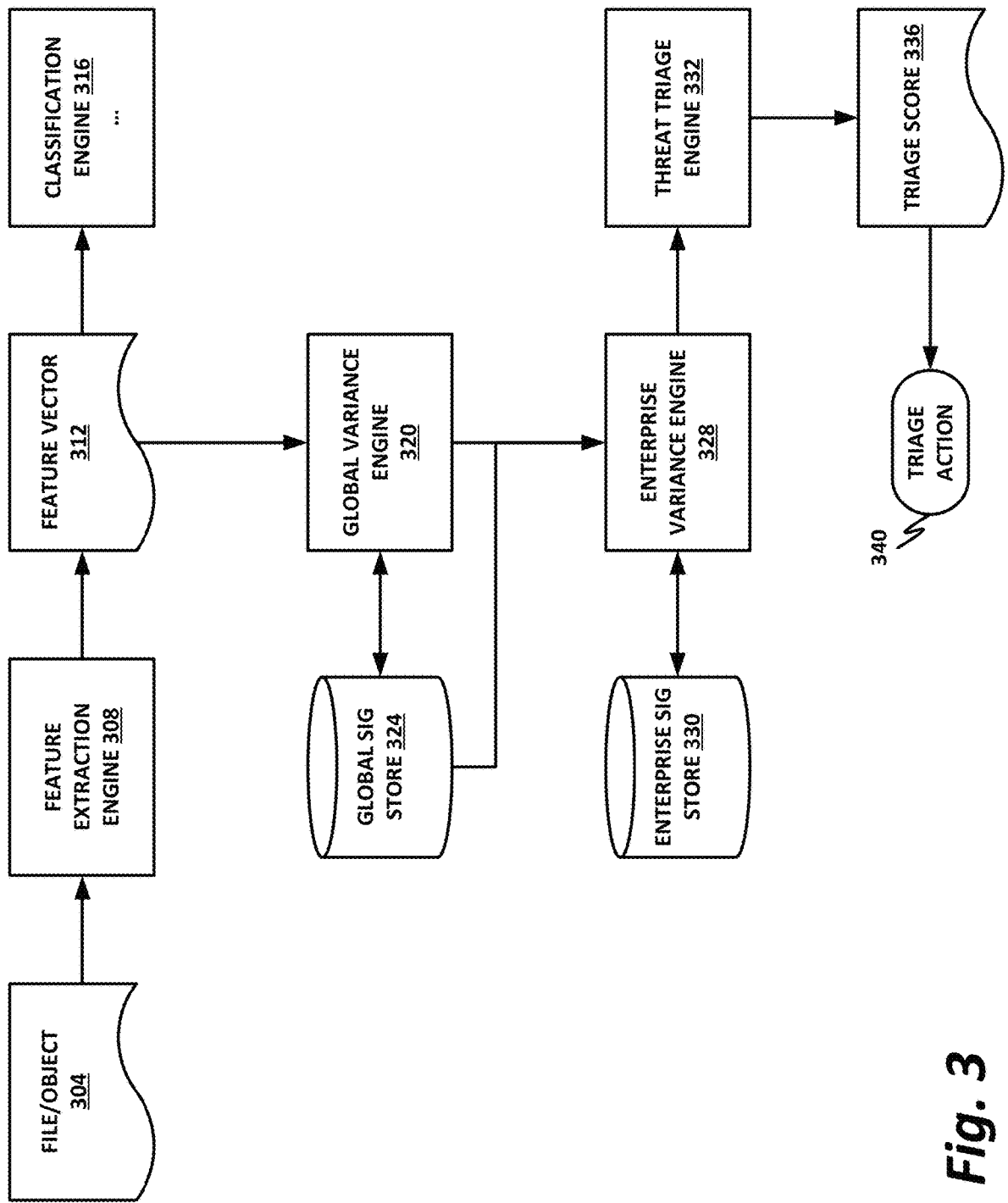
FIG. 3 is a block diagram illustrating additional selected aspects of a security system.

FIG. 3 is a block diagram illustrating additional selected aspects of a security system. In this example, a new file or object 304 is encountered by the enterprise. The new file or object may not have a known reputation on the enterprise. If object 304 has a known reputation, then the known reputation can simply be applied. For example, if the known reputation is good, the object can simply be permitted to operate on the network according to its intended function. On the other hand, if the object is known to be bad, then it can be blocked by enterprise gateways and other resources before it ever enters the enterprise network. In one example, an enterprise workflow includes a malware scanner that applies known reputations to known objects, including known malicious objects.

Assuming that object 304 does not have a known reputation, and therefore requires additional analysis by the enterprise, then a feature extraction engine 308 may analyze object 304 to extract features from the object. Feature extraction engine 308 may extract both static and dynamic features. Many different static and dynamic features are available. In addition to the static features listed in Table 1 above, it should be noted that dynamic features may also be used. Dynamic features could include, for example, behavioral features. Behavioral features include the behavior of the object while executing. The behavior can be observed and featurized, so that certain behaviors act as individual tokens for analysis.

Feature extraction engine 308 builds a feature vector 312 for object 304. Feature vector 312 includes a list of all the features extracted by feature extraction engine 308. From feature vector 312, classification engine 316 classifies the object as suspicious or not. This is similar to classification engine 216 of FIG. 2.

The workflow of FIG. 3 also includes additional aspects, besides determining via classification engine 316 whether the object is suspicious. Specifically, this workflow illustrates other information that may be inferred from feature vector 312.

As described above, feature vector 312 may include both static and dynamic features. These static and dynamic features can be used in some embodiments to provide clustering of feature sets.

Figure 5:
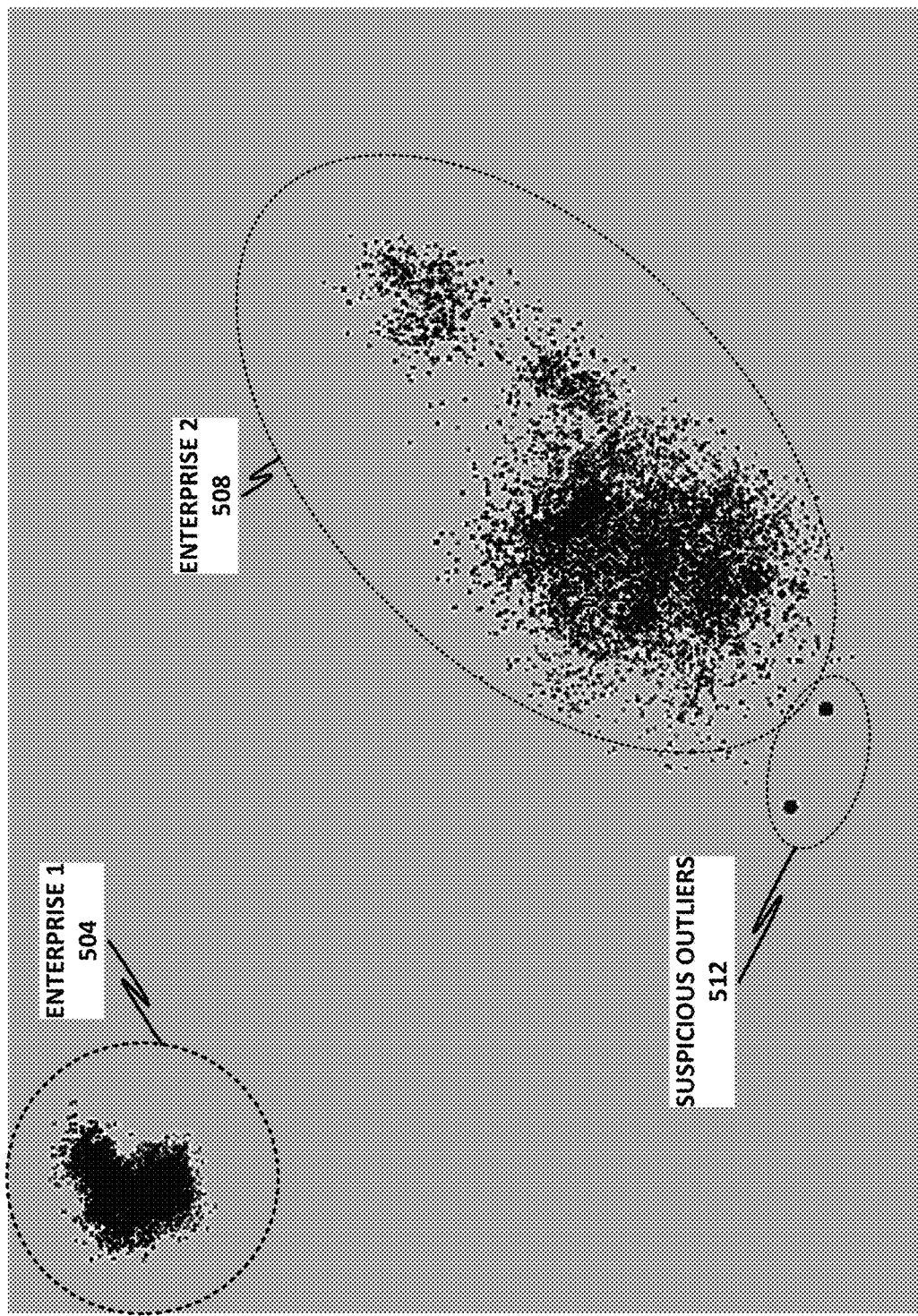
FIG. 5 illustrates clustering of feature sets.

Such clustering is illustrated in FIG. 5, where a machine learning algorithm such as the Hariri isolation forest algorithm is used to group similar objects. These objects cluster into "galaxies" of similarity, and may be clustered by enterprise. As illustrated in FIG. 5, enterprise 1 includes a first cluster 504, while enterprise 2 includes a second cluster 508. These clusters show similarity of shared features between various objects. In general, the more similar the feature vectors are for the two objects, the closer they are to each other. It should be noted that while FIG. 5 necessarily illustrates the clustering in a two-dimensional space, clustering can actually be calculated in a three-dimensional space. Thus, the illustration of FIG. 5 may be understood to represent a two-dimensional view of a three-dimensional space.

The teachings of the present specification, including the workflow of FIG. 3, can be used to identify suspicious outliers 512.

Figure 4:
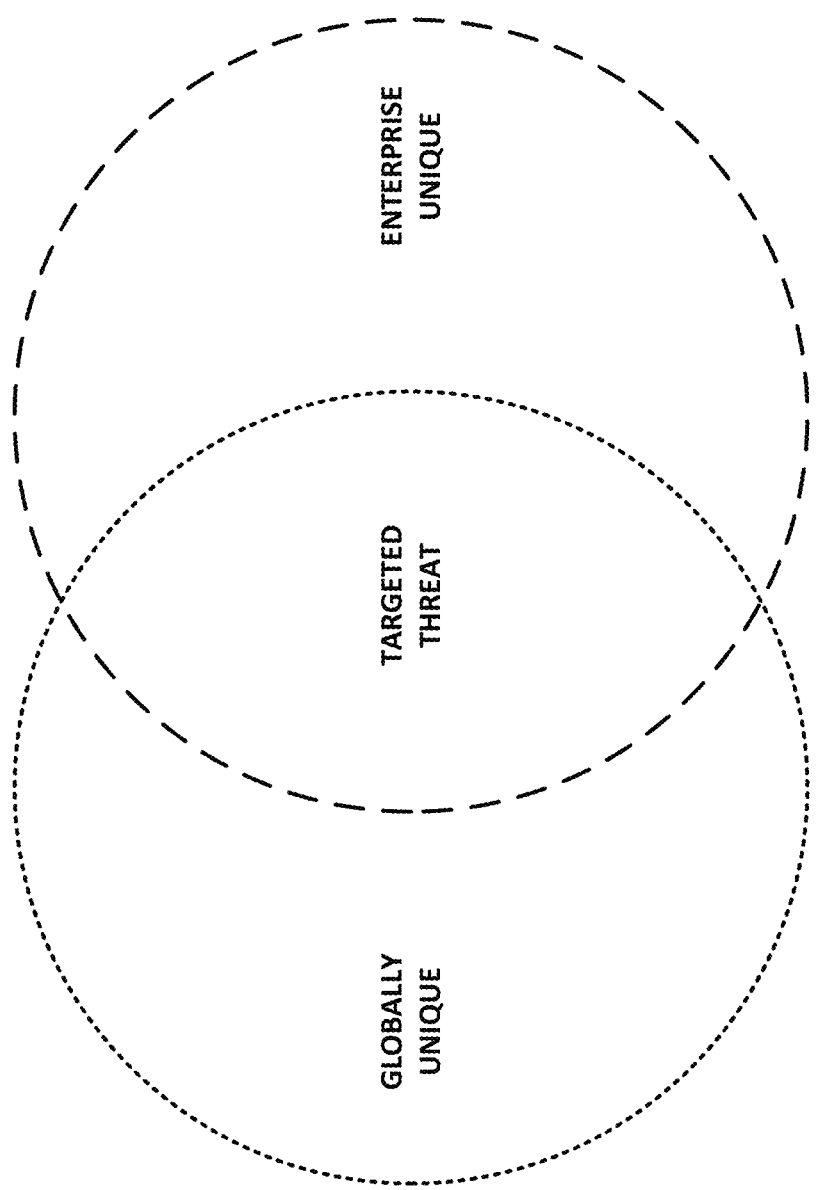
FIG. 4 illustrates a Venn diagram for identifying suspicious outliers.

FIG. 4 illustrates a Venn diagram for identifying suspicious outliers. Specifically, in the Venn diagram of FIG. 4, some objects are globally unique, while other objects are enterprise unique. Viewing suspicious outliers 512 of FIG. 5, it can be seen that suspicious outliers 512 meet both criteria. They appear near enterprise 2, and thus may represent an attack on enterprise 2. But they do not cluster well with either enterprise 1 or enterprise 2, or with any other global data. Thus, suspicious outliers 512 have both high global uniqueness and high enterprise uniqueness. As described above, this combination of uniqueness makes it more likely that suspicious outliers 512 could represent a targeted attack on enterprise 2.

Returning to the workflow of FIG. 3, feature vector 312 can be used to determine whether an object has high enterprise and/or global variance. This can be done by computing a variance between a selected set of known objects, and determining the uniqueness.

Thus, a global variance engine 320 operates with a global signature store 324. Global signature store 324 includes signatures of a large number of known global objects. Global signature store 324 may also include a pre-trained machine learning model, such as a Hariri model, from which variance can be calculated. Global variance engine 320 can then calculate how well the newly encountered object clusters with other objects within global signature store 324.

Enterprise variance engine 328 can then compute how well the new object clusters with other objects known to the enterprise. Enterprise variance engine 328 can query an enterprise signature store 330 to provide a baseline for enterprise signatures, as well as a pre-trained model for that enterprise.

Global variance engine 320 and enterprise variance engine 328 can both provide a variance score that threat triage engine 332 can use to evaluate the seriousness of the threat. If both global variance engine 320 and enterprise variance engine 328 provide a relatively high score (e.g., a score above a given threshold), then threat triage engine 332 may assign a high triage score 336. On the other hand, if the new object lacks either high enterprise uniqueness or high global uniqueness, then threat triage engine 332 may assign a relatively lesser triage score 336. Note that triage score 336 is not necessarily a measure of the maliciousness of object 304. That maliciousness score may be assigned by classification engine 316. Rather, triage score 336 represents the importance of providing more detailed analysis of object 304, if it is found to be malicious. In other words, not all malicious objects warrant the same degree of urgency in investigation. An APT, for example, may warrant more urgent or immediate investigation than a piece of generalized malware.

Thus, triage action 340 may include providing object 304 to an existing security infrastructure and/or to human security experts for investigation. The urgency of that investigation may be informed by triage score 336.

Figure 6:
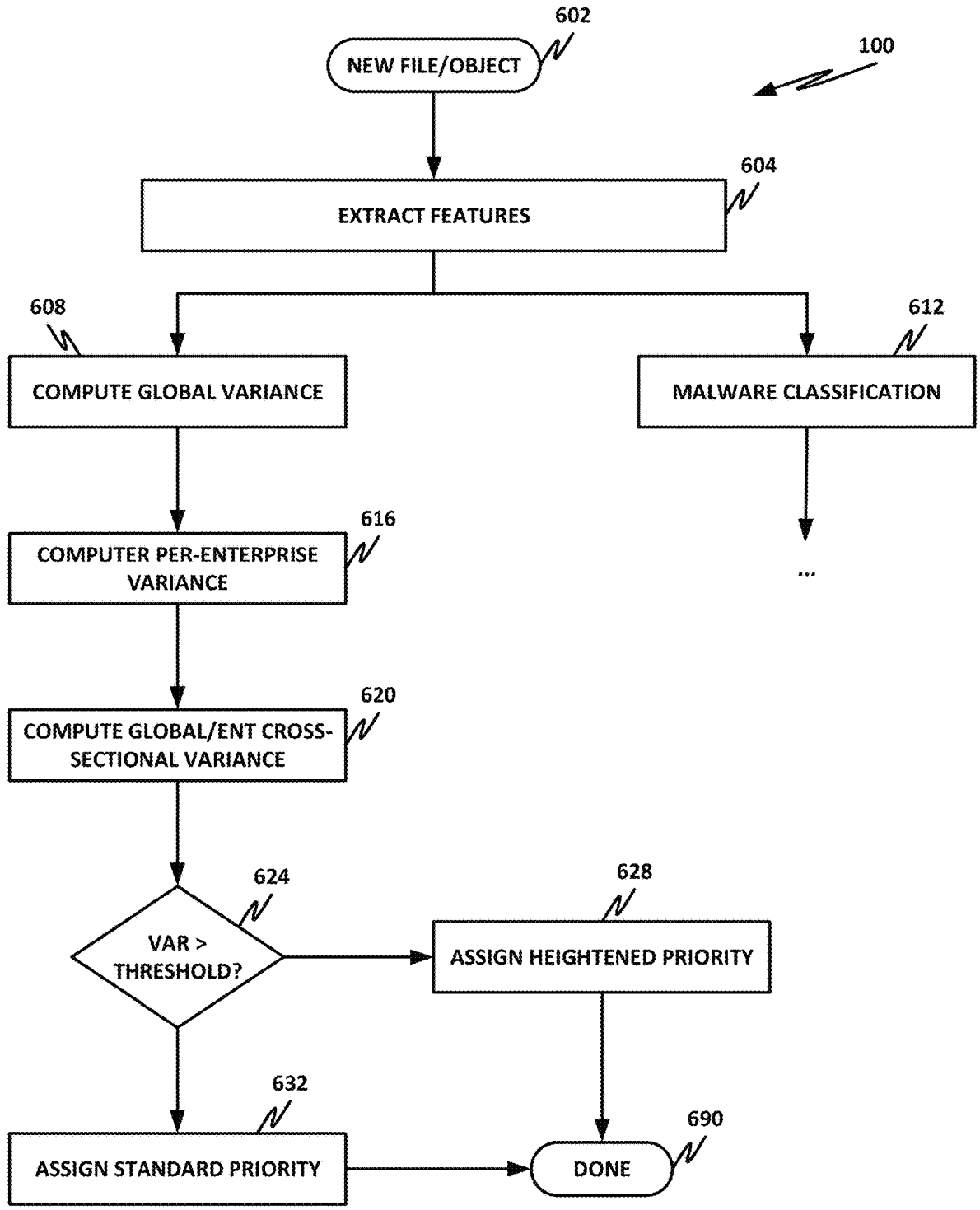
FIG. 6 is a flowchart illustrating a method of prioritizing investigation within an enterprise.

FIG. 6 is a flowchart of a method 600 of prioritizing investigation within an enterprise.

Starting at block 602, a new file or object is encountered within the enterprise. This new file or object may require additional investigation.

After features have been extracted in block 604, parallel processes may occur. In block 612, malware classification may occur, as illustrated in FIG. 2. This malware classification may be done according to known methods.

In parallel with malware classification 612, additional processing may be performed, such as triaging, as illustrated in FIG. 3.

In block 608, a device such as a global variance engine may compute a global variance for the new object. The global variance measures the uniqueness of the object in the context of a global database. This measure may be performed, in one example, by a security services provider such as security services provider 190 of FIG. 1. The security services provider advantageously has the ability to see a global perspective of new objects, and thus is well-positioned to identify a global variance.

In block 616, an agent such as an enterprise variance engine computes per-enterprise variance for the new object. In some embodiments, this may be performed at the enterprise, itself. However, in other embodiments, this may also be performed at a security services provider. In that case, the security services provider has the advantageous ability to offer its clients the additional service of being able to notify them when an attack appears to be occurring on the enterprise. In some examples, the security services provider computes enterprise variances for a plurality of enterprises, and identifies an enterprise if an object requires further analysis.

In block 620, an appropriate engine such as a threat triage engine may compute a global and enterprise cross-sectional variance, as illustrated by the Venn diagram in FIG. 4. A newly identified object that has both high global variance and high enterprise variance may represent a more substantial threat to that enterprise.

In decision block 624, the system determines whether the cross-sectional variance is greater than a threshold. If the cross-sectional variance is greater than the threshold, then in block 628, the system may assign a heightened priority to the object.

Returning to decision block 624, if the cross-sectional variance is not greater than the threshold, then in block 632, the object may be assigned a standard priority.

In block 690, the method is done.

Figure 7A:
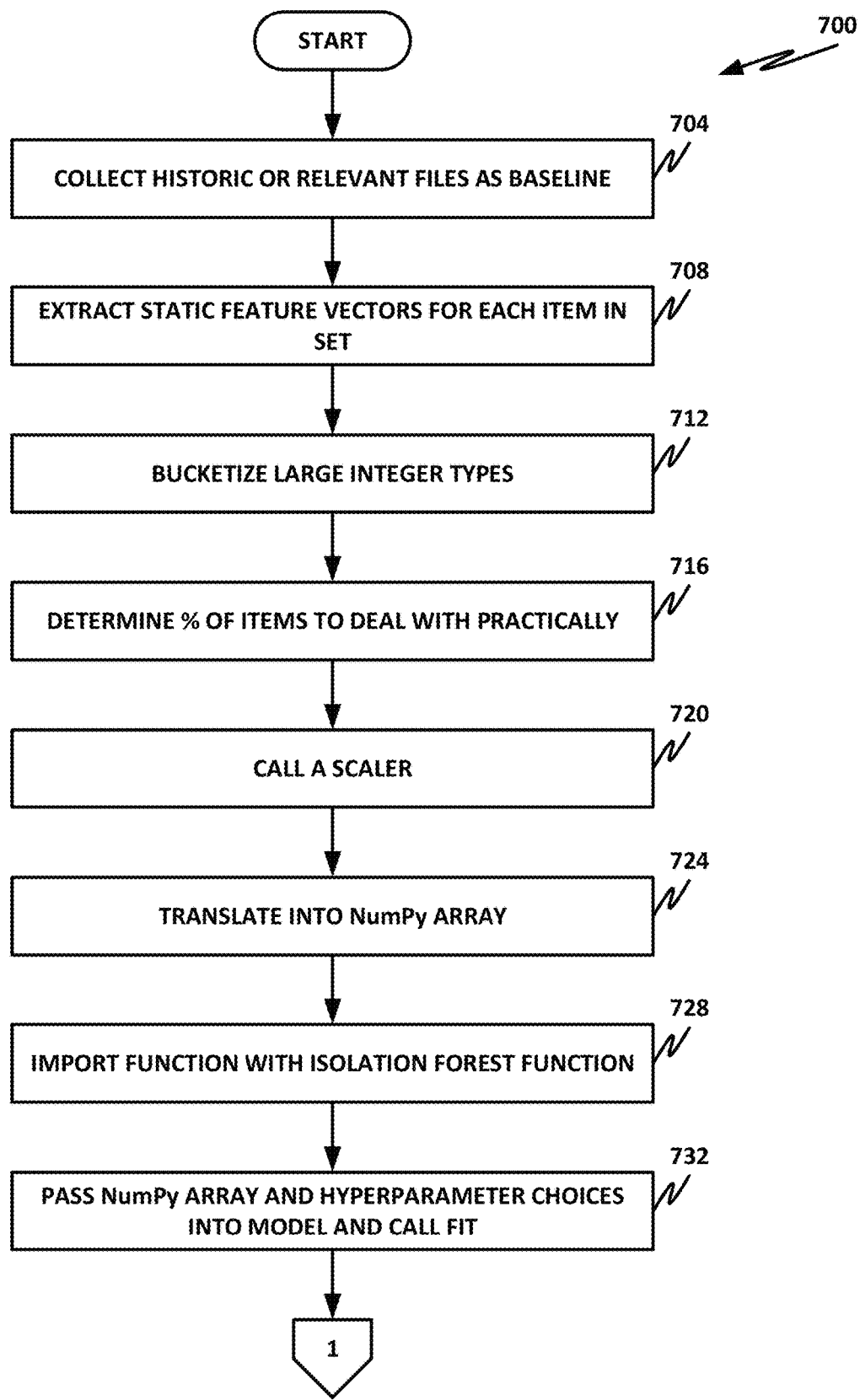
FIGS. 7a-7b are a flowchart representing additional selected steps for assigning a priority to an object.
Figure 7B:
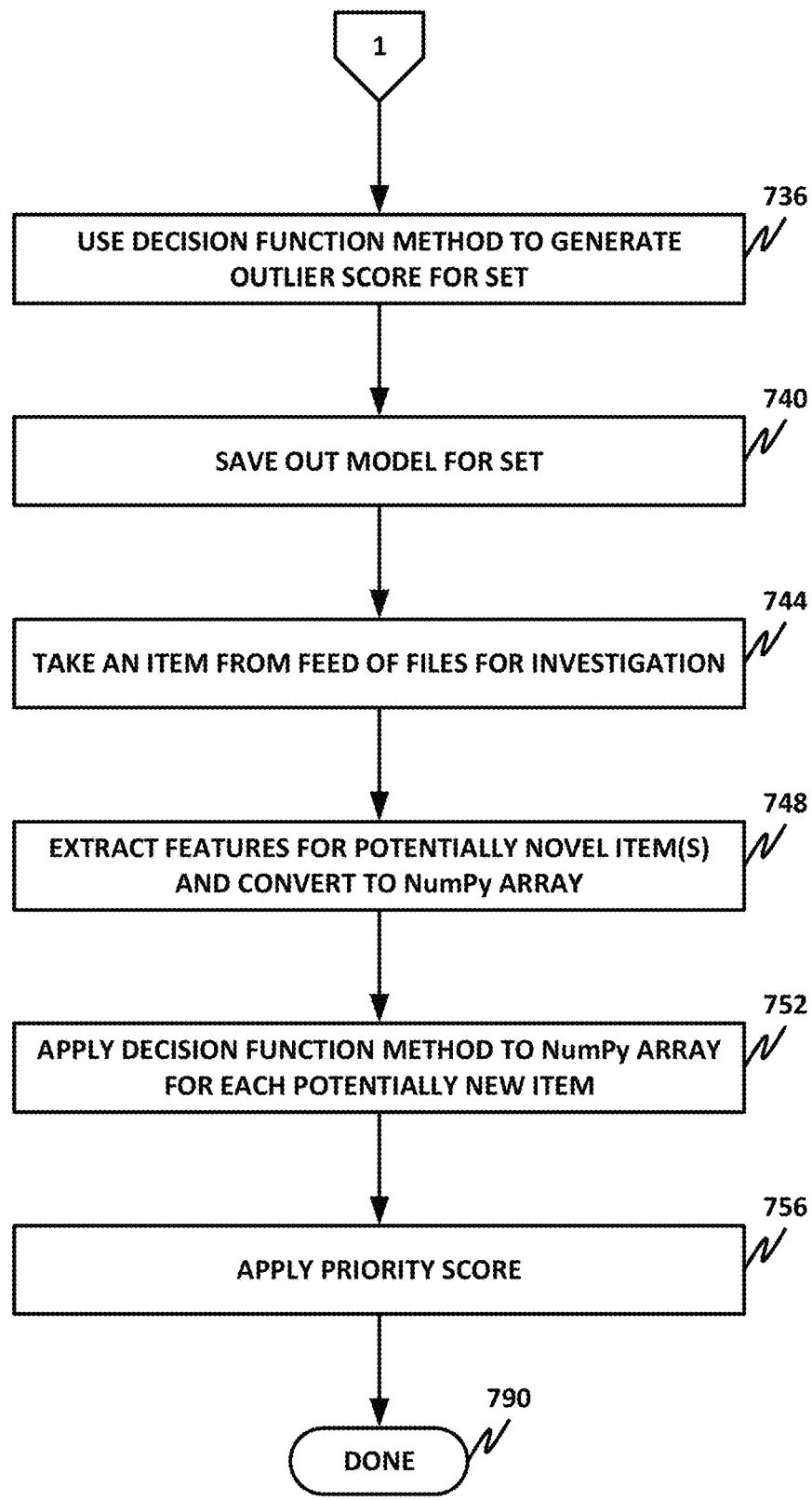

FIGS. 7a-7b are a flowchart 700 representing additional selected steps for assigning a priority to an object. Note that in some embodiments, the operations of method 700 may, in some cases, intersect with the operations of method 600. The two flowcharts are provided separately to illustrate different aspects of the teachings of the present specification.

Starting in block 704, the system may collect a historic or specific relevant set of files, such as portable executables, APTs, fileless attacks, or others. This may represent a set of objects that can form a baseline. Variance can be computed using these objects as a baseline. The objects may be malware, legitimate software, a software family, or other objects that can be used as a baseline.

In block 708, the system extracts static and/or dynamic features for each item in the set.

At block 712, the system may optionally bucketize large integer types. In other words, large integer-type features, such as file size for example, may be bucketed into more discrete buckets. Note that in at least some embodiments, this is automatically done by the random forest algorithm. But if scalability is an issue, this step aids in deduplication of the data set.

In block 716, the system or a system programmer determines a percentage or a subsection of the items that can be dealt with practically in the current model. The system may then set a contamination level to be this fraction that is to be segregated. The contamination level is the algorithm variable used to indicate the proportion of the items that are likely to be very different. It can be used to provide a mechanism of restriction the items to be examined in detail.

In block 720, the system may call a scaler. Note that calling a scaler may not be strictly necessary, but in at least some embodiments, may be helpful in plotting some items.

In block 724, the set of objects may be translated into an array. In one example, Numerical Python (NumPy) may be used as a convenient library or add-on to the Python programming language that is particularly suited to numerical calculations of this type. Thus, in at least some embodiments, the array may be a NumPy array.

In block 728, the system (e.g., Python) imports a function with an isolation forest function. In some embodiments, this may include loading an off-the-shelf library that provides the appropriate algorithm (e.g., isolation forest, or extended isolation forest). This library provides a model that can then be trained on the appropriate dataset.

In block 732, the system passes the NumPy array and a set of hyperparameter choices into the model. The system may then call the "fit" subroutine of the model.

Following off-page connector 1 to FIG. 7b, in block 736, the system may use a decision function method to generate an outlier score for the data set in question. This outlier score represents a variance of an object under analysis from a baseline. In this case, an outlier score is generated for each object in the training set, and this vector of outlier scores can be used to generate a "galaxy" of clustered objects.

In block 740, the system saves out the model for this set.

In block 744, the system may begin to analyze a feed of incoming objects, such as new files, portable executables, or other objects that are provided for investigation. In block 744, the system takes a next item from the feed of files for investigation.

In block 746, the system extracts features for potentially novel items, and converts those to a NumPy array, as described above.

In block 752, the system applies the decision function method to the NumPy array for each of the potentially new items. This yields an individual variance score for the item. The variance score could be a global variance score or an enterprise variance score, depending on the data set.

In block 756, the system applies the computed priority score to the object. This may include assigning a cross-sectional variance score for triaging purposes.

Figure 8:
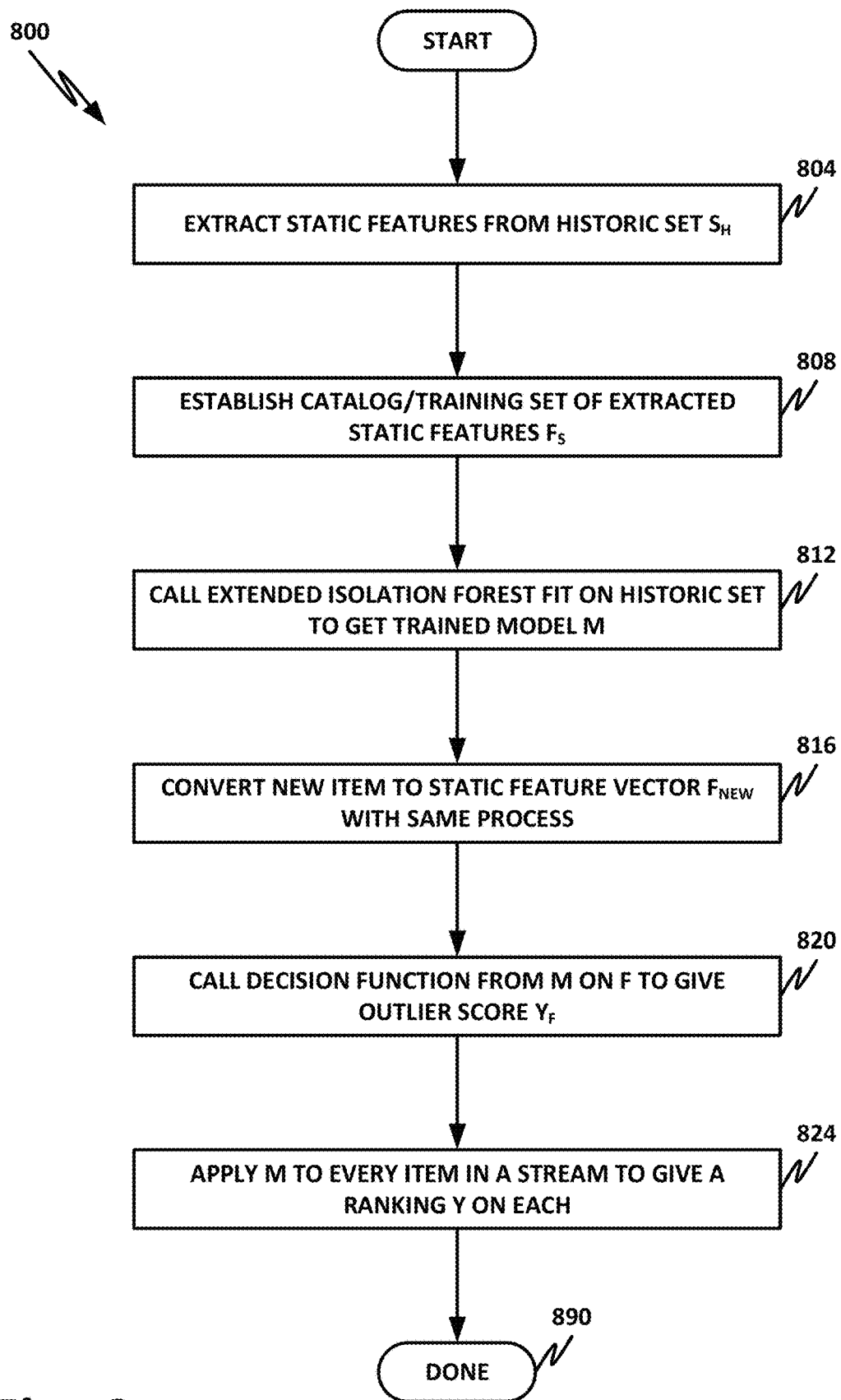
FIG. 8 is a flowchart of a method, according to the teachings of the present specification.

FIG. 8 is a flowchart of a method 800 that may be performed by a system, according to the present specification. Note that at least some of the operations of method 800 intersect with at least some of the operations of methods 600 and 700, as described above. This is not intended to imply mutual exclusivity between the methods, but rather, the different flowcharts focus on various aspects of the disclosed methods.

In general terms, method 700 provides a "computer science" view of the process, whereas method 800 is more focused on a mathematical description of the process. Both flow charts illustrate the use of historical data sets to custom tune the parameters in a complex mathematical function that is encoded within a Python machine learning library. When new items are passed into the "trained" mathematical function, the algorithm provides a score on the new item to indicate how unusual it is compared to the items in the historical set.

Method 800 particularly describes the application of a machine learning algorithm, such as the Hariri decision tree forest.

The Hariri decision tree forest is described in more detail in the academic paper Extended Isolation Forest, which is incorporated herein by reference.

In block 804, according to the teachings of the machine learning model, the system extracts a set of static or other features from a historic data set $S_H$.

In block 808, the system establishes a catalog or a training set of extracted static features $F_S$.

In block 812, the system calls an extended isolation forest fit on the historic set to get a trained model M.

In block 816, the system converts the new item to a static feature vector $F_{NEW}$ using the same process that was used to establish the training set in block 808. Thus, a feature vector is provided for the new data set, and can be usefully compared to a set of static features for the training data set established in block 808.

In block 820, the system calls the decision function from "M" on "F" (a feature set) to yield a new outlier score $Y_F$. This outlier score is a representation of the uniqueness of the new feature set in comparison to the feature sets in the training model M.

In block 824, the system applies M to every item in a stream (such as an incoming stream of objects for analysis) to provide a ranking Y for each object.

In block 890, the method is done.

Figure 9:
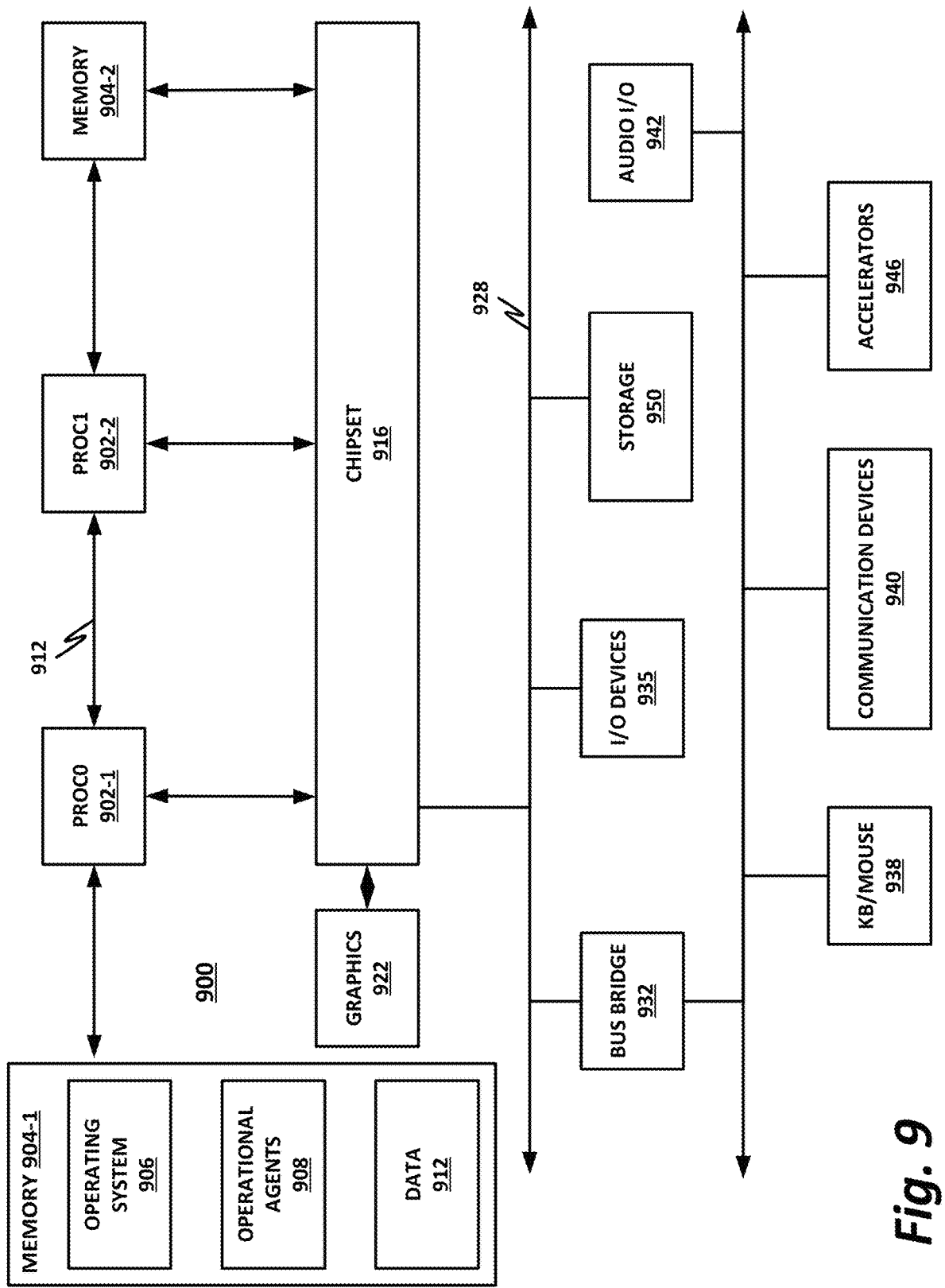
FIG. 9 is a block diagram of selected elements of a hardware platform.

FIG. 9 is a block diagram of a hardware platform 900. Embodiments of hardware platform 900 may be configured or adapted for providing analysis priority of objects from cross-sectional variance, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via network interface 948, or retrieved from another source via any suitable interconnect. Once received (from any source), the instructions may be loaded into memory 904, and may then be executed by one or more processor 902 to provide elements such as an operating system 906, operational agents 908, or data 912.

Figure 11:
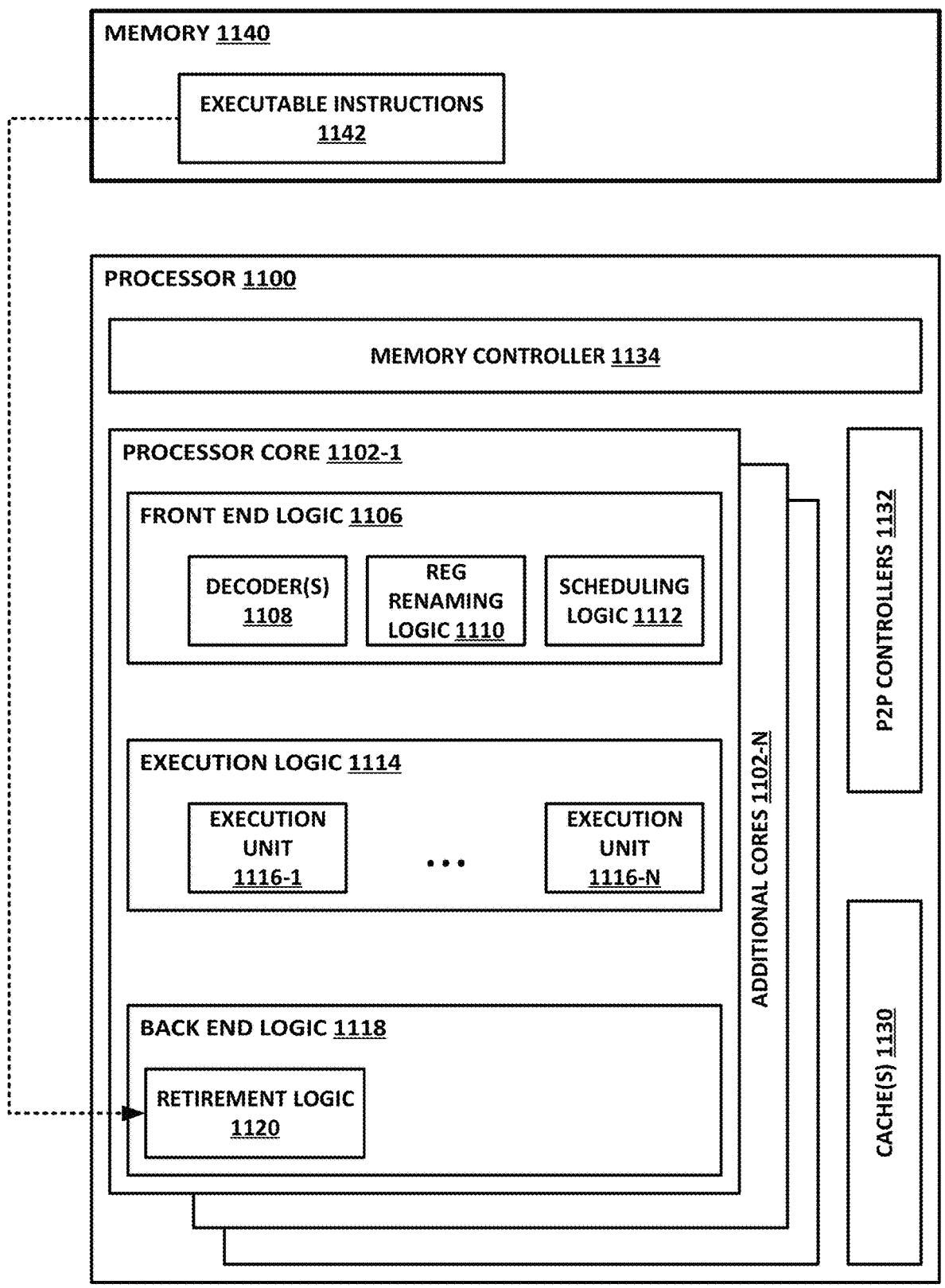
FIG. 11 is a block diagram of selected elements of a processor.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Details of processors 902 are not illustrated in this FIGURE, but one embodiment is illustrated in FIG. 11. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a CPU 912 or on one or more different dies or packages. Each chipset may support any suitable number of CPUs 912. A chipset 916 (which may be a chipset, uncore, Northbridge, Southbridge, or other suitable logic and circuitry) may also include one or more controllers to couple other components to one or more CPUs.

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with processor 910 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of CPUs 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, network interface 948, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by network interface 948 and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O devices 942, a data storage device 944, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, processor 902 may retrieve a copy of the operational agent (or software portions thereof) from storage 950 and load it into memory 904. Processor 910 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic input/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 948 may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 948 may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 10:
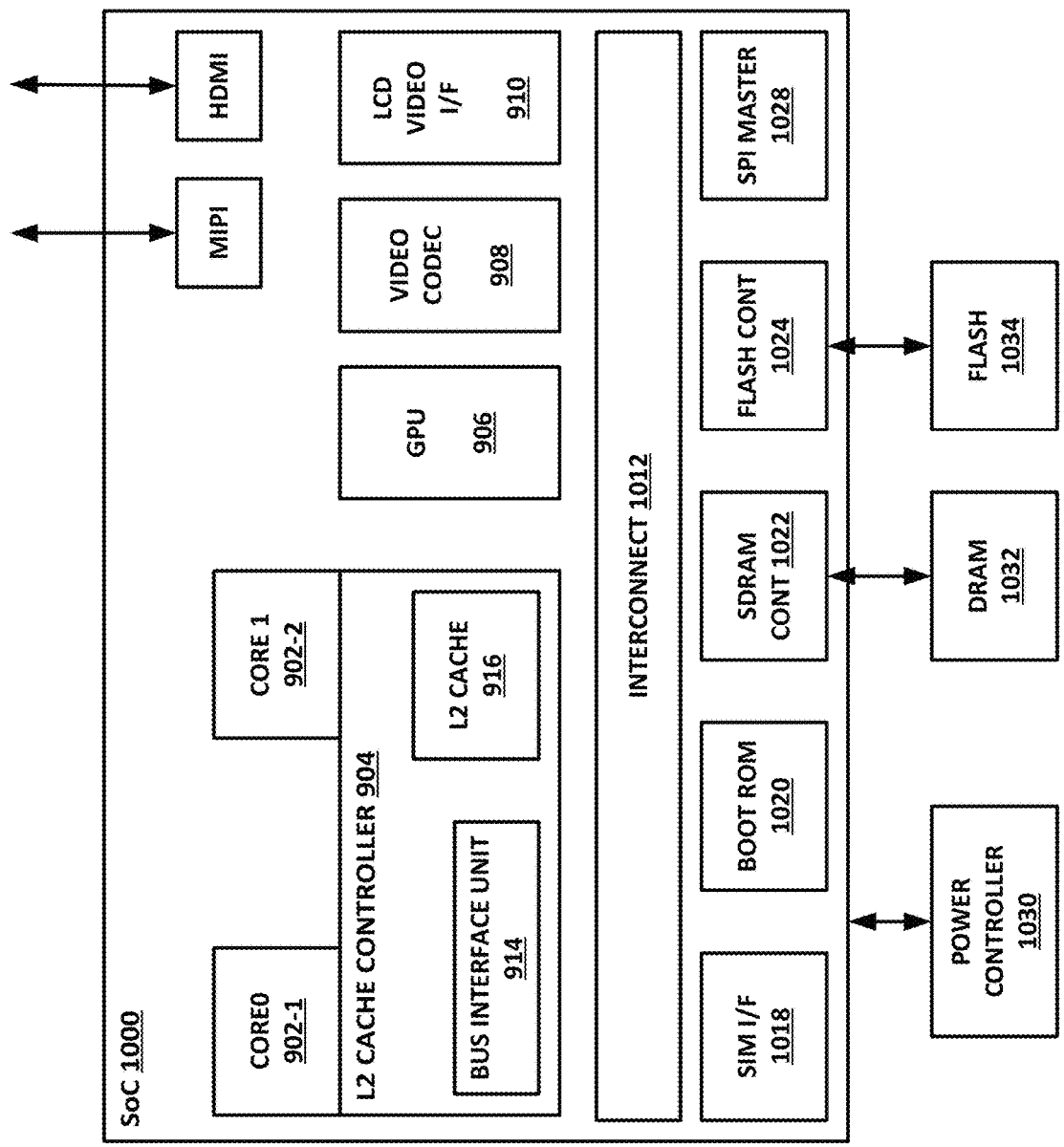
FIG. 10 is a block diagram of selected elements of a system-on-a-chip (SoC).

FIG. 10 is a block illustrating selected elements of an example SoC 1000. Embodiments of SoC 1000 may be configured or adapted for providing analysis priority of objects from cross-sectional variance, as disclosed in the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002a and 1002b. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) master 1028, a suitable power control 1030, a dynamic RAM (DRAM) 1032, and flash 1034. In addition, one or more embodiments include one or more communication capabilities, interfaces, and features such as instances of Bluetooth™ 1036, a 3G modem 1038, a global positioning system (GPS) 1040, and an 802.11 Wi-Fi 1042.

Designers of integrated circuits such as SoC 1000 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 11 is a block diagram illustrating selected elements of a processor 1100. Embodiments of processor 1100 may be configured or adapted for providing analysis priority of objects from cross-sectional variance, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1100 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1100 includes one or more processor cores 1102, including core 1102-1-1102-N. Cores 1102 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1100 may include at least one shared cache 1130, which may be treated logically as part of memory 1140. Caches 1130 may be filled according to known caching techniques, and may store instructions and/or data that may be used by one or more components of processor 1100.

Processor 1100 may include an integrated memory controller (MC) 1134, to communicate with memory 1140. Memory controller 1134 may include logic and circuitry to interface with memory 1140, and may also include a cache controller to handle filling and evicting instructions and data to and from cache 1130.

By way of example, each core 1102 may include front-end logic 1106, execution logic 1114, and backend logic 1118.

In the illustrated embodiment, front-end logic 1106 includes an instruction decoder or decoders 1108, register renaming logic 1110, and scheduling logic 1112. Decoder 1108 may decode instructions received. Register renaming logic 1110 may provide register renaming, for example to facilitate pipelining. Scheduling logic 1112 may schedule instruction execution, and may provide out-of-order (OOO) execution. Front-end logic 1106 may fetch incoming instructions, perform various processing (e.g., caching, decoding, branch predicting, etc.), and pass instructions to execution logic 1114.

Execution logic 1114 includes one or more execution units 1116-1-1116-N. Execution units 1116 may include hardware instructions and microcode to carry out the provided instructions.

Backend logic 1118 includes retirement logic 1120. Core 1102 may provide for speculative execution of instructions, branch prediction, and similar. Retirement logic 1120 may be configured to determine which predicted instructions were actually needed by the program flow.

Processor 1100 may also include a PtP controller 1132, which enables connection to an uncore, chipset, Northbridge, Southbridge, or bus, by way of example.

Figure 12:
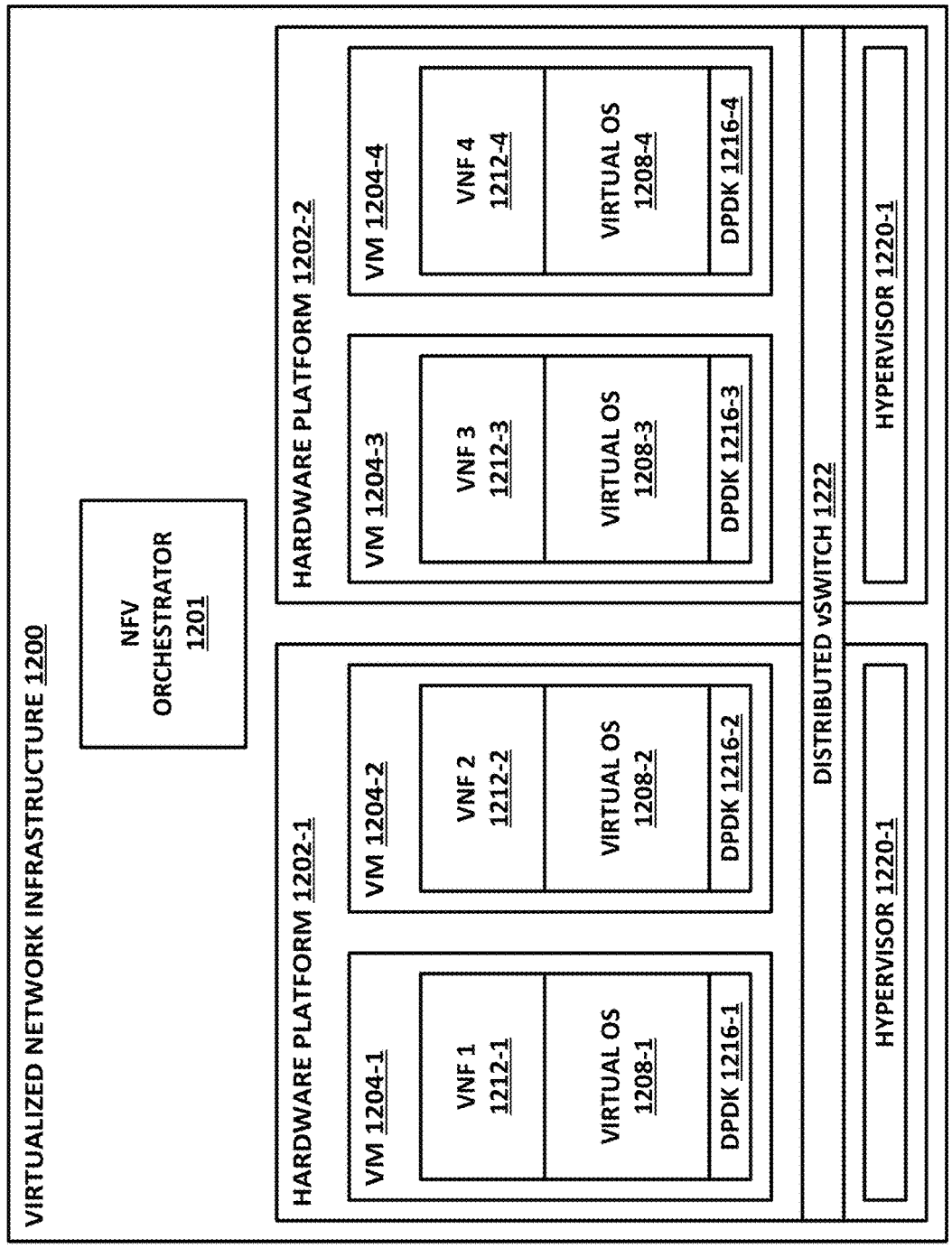
FIG. 12 is a block diagram of selected elements of a network function virtualization (NFV) infrastructure.

FIG. 12 is a block diagram of a network function virtualization (NFV) infrastructure 1200. Embodiments of NFV infrastructure 1200 may be configured or adapted for providing analysis priority of objects from cross-sectional variance, as disclosed in the present specification.

NFV is an aspect of network virtualization that is generally considered distinct from, but that can still interoperate with, SDN. For example, VNFs may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 12, an NFV orchestrator 1201 manages a number of the VNFs 1212 running on an NFVI 1200. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1201 a valuable system resource. Note that NFV orchestrator 1201 may provide a browser-based or graphical configuration interface, and in some embodiments may be integrated with SDN orchestration functions.

Note that NFV orchestrator 1201 itself may be virtualized (rather than a special-purpose hardware appliance). NFV orchestrator 1201 may be integrated within an existing SDN system, wherein an operations support system (OSS) manages the SDN. This may interact with cloud resource management systems (e.g., OpenStack) to provide NFV orchestration. An NFVI 1200 may include the hardware, software, and other infrastructure to enable VNFs to run. This may include a hardware platform 1202 on which one or more VMs 1204 may run. For example, hardware platform 1202-1 in this example runs VMs 1204-1 and 1204-2. Hardware platform 1202-2 runs VMs 1204-3 and 1204-4. Each hardware platform may include a hypervisor 1220, virtual machine manager (VMM), or similar function, which may include and run on a native (bare metal) operating system, which may be minimal so as to consume very few resources.

Hardware platforms 1202 may be or comprise a rack or several racks of blade or slot servers (including, e.g., processors, memory, and storage), one or more data centers, other hardware resources distributed across one or more geographic locations, hardware switches, or network interfaces. An NFVI 1200 may also include the software architecture that enables hypervisors to run and be managed by NFV orchestrator 1201.

Running on NFVI 1200 are a number of VMs 1204, each of which in this example is a VNF providing a virtual service appliance. Each VM 1204 in this example includes an instance of the Data Plane Development Kit (DPDK), a virtual operating system 1208, and an application providing the VNF 1212.

Virtualized network functions could include, as nonlimiting and illustrative examples, firewalls, intrusion detection systems, load balancers, routers, session border controllers, DPI services, network address translation (NAT) modules, or call security association.

The illustration of FIG. 12 shows that a number of VNFs 1204 have been provisioned and exist within NFVI 1200. This FIGURE does not necessarily illustrate any relationship between the VNFs and the larger network, or the packet flows that NFVI 1200 may employ.

The illustrated DPDK instances 1216 provide a set of highly-optimized libraries for communicating across a virtual switch (vSwitch) 1222. Like VMs 1204, vSwitch 1222 is provisioned and allocated by a hypervisor 1220. The hypervisor uses a network interface to connect the hardware platform to the data center fabric (e.g., an HFI). This HFI may be shared by all VMs 1204 running on a hardware platform 1202. Thus, a vSwitch may be allocated to switch traffic between VMs 1204. The vSwitch may be a pure software vSwitch (e.g., a shared memory vSwitch), which may be optimized so that data are not moved between memory locations, but rather, the data may stay in one place, and pointers may be passed between VMs 1204 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1222 is illustrated, wherein vSwitch 1222 is shared between two or more physical hardware platforms 1202.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a processor and a memory; a data store having stored thereon trained models $M_{GLOBAL}$ and $M_{ENT}$, wherein model $M_{GLOBAL}$ comprises a clustering model of proximity and prevalence of a first body of computing objects, and $M_{ENT}$ comprises a clustering model of proximity and prevalence of a second body of computing object; and instructions encoded within the memory to instruct the processor to: receive an object under analysis; apply a machine learning model to compute a global variance score between the object under analysis and $M_{GLOBAL}$; apply the machine learning model to compute an enterprise variance score between the object under analysis and $M_{ENT}$; compute from the global variance score and the enterprise variance score a cross-sectional variance score; and assign the object under analysis an analysis priority according to the cross-sectional variance score.

There is further disclosed an example computing apparatus, wherein the instructions are further to identify the object under analysis for priority expert analysis if the cross-sectional variance score exceeds a threshold.

There is further disclosed an example computing apparatus, wherein the machine learning model is an isolated random forest algorithm.

There is further disclosed an example computing apparatus, wherein the machine learning model is an extended isolated random forest algorithm.

There is further disclosed an example computing apparatus, wherein computing a variance score comprises identifying the object under analysis as an anomaly according to the machine learning model.

There is further disclosed an example computing apparatus, wherein applying the machine learning model comprises extracting features from the object under analysis.

There is further disclosed an example computing apparatus, wherein the features comprise static features.

There is further disclosed an example computing apparatus, wherein the features comprise dynamic behavioral features.

There is further disclosed an example computing apparatus, wherein applying the machine learning model comprises converting the feature set to an array.

There is further disclosed an example computing apparatus, wherein the array is a NumPy array.

There is further disclosed an example computing apparatus, wherein applying the machine learning algorithm comprises bucketing large integer features into smaller discrete buckets.

There is further disclosed an example computing apparatus, wherein the data store comprises a plurality of enterprise models for a plurality of monitored enterprises, and wherein $M_{ENT}$ is selected from the plurality of enterprise models.

There is further disclosed an example computing apparatus, wherein the instructions are further to notify an enterprise represented by $M_{ENT}$ of a potential advanced persistent threat (APT) attack.

There is also disclosed an example of one or more tangible, non-transitory computer-readable media having stored thereon executable instructions to instruct a processor to: receive an object with an unknown network reputation; identify the object for prioritization; receive a global uniqueness score for the object, the global uniqueness score comprising a measure of a degree to which the object is globally unique; receive an enterprise uniqueness score for the object, the enterprise uniqueness score comprising a measure of a degree to which the object is unique to a specific enterprise; compute a cross-sectional uniqueness score from the global uniqueness score and the enterprise uniqueness score, wherein the cross-sectional uniqueness score varies directly with the global uniqueness score and the enterprise uniqueness score; and assign an analysis priority to the object according to the cross-sectional uniqueness score, wherein the analysis priority varies directly with the cross-sectional uniqueness score.

There is further disclosed an example of one or more tangible, non-transitory computer-readable media, wherein the instructions are further to compute the global uniqueness score, comprising receiving a trained global model $M_{GLOBAL}$ comprising a clustering of global objects, and applying a machine learning algorithm to $M_{GLOBAL}$ and the object.

There is further disclosed an example of one or more tangible, non-transitory computer-readable media, wherein the instructions are further to compute the enterprise uniqueness score, comprising receiving a trained global model $M_{ENT}$ comprising a clustering of enterprise objects, and applying a machine learning algorithm to $M_{ENT}$ and the object.

There is further disclosed an example of one or more tangible, non-transitory computer-readable media, wherein the machine learning algorithm is an isolated random forest algorithm.

There is further disclosed an example of one or more tangible, non-transitory computer-readable media, wherein the machine learning algorithm is an extended isolated random forest algorithm.

There is further disclosed an example of one or more tangible, non-transitory computer-readable media, wherein computing the uniqueness score comprises identifying the object as an anomaly according to the machine learning algorithm.

There is further disclosed an example of one or more tangible, non-transitory computer-readable media, wherein applying the machine learning algorithm comprises extracting features from the object under analysis.

There is further disclosed an example of one or more tangible, non-transitory computer-readable media, wherein the features comprise static features.

There is further disclosed an example of one or more tangible, non-transitory computer-readable media, wherein the features comprise dynamic behavioral features.

There is further disclosed an example of one or more tangible, non-transitory computer-readable media, wherein applying the machine learning model comprises converting the feature set to an array.

There is further disclosed an example of one or more tangible, non-transitory computer-readable media, wherein the array is a NumPy array.

There is further disclosed an example of one or more tangible, non-transitory computer-readable media, wherein applying the machine learning algorithm comprises bucketing large integer features into smaller discrete buckets.

There is further disclosed an example of one or more tangible, non-transitory computer-readable media, wherein the instructions are further to identify the object under analysis for priority expert analysis if the cross-sectional variance score exceeds a threshold.

There is further disclosed an example of one or more tangible, non-transitory computer-readable media, wherein the instructions are to access a data store comprising a plurality of enterprise models for a plurality of monitored enterprises.

There is further disclosed an example of one or more tangible, non-transitory computer-readable media, wherein the instructions are further to notify a monitored enterprise of a potential advanced persistent threat (APT) attack.

There is also disclosed an example computer-implemented method of prioritizing analysis of unknown objects according to a cross-sectional variance score, comprising: receiving a trained global model $M_{GLOBAL}$ comprising a machine learning derived clustering of known global objects according to a machine learning algorithm; receiving a trained enterprise model $M_{ENT}$ comprising a machine learning derived clustering of known enterprise objects according to the machine learning algorithm; computing a global variance score for the unknown object comprising applying the machine learning algorithm to $M_{GLOBAL}$ and the unknown object to provide anomaly detection, computing an enterprise variance score for the unknown object comprising applying the machine learning algorithm to $M_{ENT}$ and the unknown object to provide anomaly detection, computing a cross-sectional variance score from the global uniqueness score and the enterprise uniqueness score, wherein the cross-sectional variance score varies directly with the global variance score and the enterprise variance score; and assigning an analysis priority to the unknown object according to the cross-sectional variance score, wherein the analysis priority varies directly with the cross-sectional variance score.

There is further disclosed an example method, wherein the machine learning algorithm is an isolated random forest algorithm.

There is further disclosed an example method, wherein the machine learning algorithm is an extended isolated random forest algorithm.

There is further disclosed an example method, wherein applying the machine learning algorithm comprises extracting features from the object under analysis.

There is further disclosed an example method, wherein the features comprise static features.

There is further disclosed an example method, wherein the features comprise dynamic behavioral features.

There is further disclosed an example method, wherein applying the machine learning model comprises converting the feature set to an array.

There is further disclosed an example of one or more tangible, non-transitory computer-readable media, wherein the array is a NumPy array.

There is further disclosed an example method, wherein applying the machine learning algorithm comprises bucketing large integer features into smaller discrete buckets.

There is further disclosed an example method, further comprising storing a plurality of enterprise models for a plurality of monitored enterprises.

There is further disclosed an example method, further comprising notifying a monitored enterprise of a potential advanced persistent threat (APT) attack.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus for a service provider to provide triage for suspicious objects to an enterprise network, comprising:
a processor and a memory;
a data store having stored thereon trained models $M_{GLOBAL}$ and $M_{ENT}$, wherein model $M_{GLOBAL}$ comprises a clustering model of proximity and prevalence of a global body of computing objects, and $M_{ENT}$ comprises a clustering model of proximity and prevalence of a body of computing objects for the enterprise network; and
instructions encoded within the memory to instruct the processor to:
receive from the enterprise network a set of objects requiring analysis, and select from the set an object under analysis;
apply a machine learning model to compute a global variance score between the object under analysis and $M_{GLOBAL}$;
apply the machine learning model to compute an enterprise variance score between the object under analysis and $M_{ENT}$;
compute from the global variance score and the enterprise variance score a cross-sectional variance score;
assign the object under analysis an analysis priority according to the cross-sectional variance score; and
based on the cross-sectional variance score, determine that the object under analysis is a candidate advanced persistent threat (APT) directed toward the enterprise network, assign the object under analysis elevated analysis priority, and electronically notify the enterprise network that the object under analysis is a candidate APT directed toward the enterprise network and has elevated analysis priority.

2. The computing apparatus of claim 1, wherein the instructions are further to identify the object under analysis for priority expert analysis if the cross-sectional variance score exceeds a threshold.

3. The computing apparatus of claim 1, wherein the machine learning model is an isolated random forest algorithm.

4. The computing apparatus of claim 1, wherein the machine learning model is an extended isolated random forest algorithm.

5. The computing apparatus of claim 4, wherein computing a variance score comprises identifying the object under analysis as an anomaly according to the machine learning model.

6. The computing apparatus of claim 1, wherein applying the machine learning model comprises extracting features from the object under analysis.

7. The computing apparatus of claim 6, wherein the features comprise static features.

8. The computing apparatus of claim 6, wherein the features comprise dynamic behavioral features.

9. The computing apparatus of claim 6, wherein applying the machine learning model comprises converting the features to an array.

10. The computing apparatus of claim 9, wherein the array is a numerical python (NumPy) array.

11. The computing apparatus of claim 6, wherein applying the machine learning model comprises bucketing large integer features into smaller discrete buckets.

12. The computing apparatus of claim 1, wherein the data store comprises a plurality of enterprise models for a plurality of monitored enterprises, and wherein $M_{ENT}$ is selected from the plurality of enterprise models.

13. The computing apparatus of claim 1, wherein the enterprise is represented by $M_{ENT}$.

14. One or more tangible, non-transitory computer-readable media having stored thereon executable instructions to instruct a processor to provide triage for suspicious objects to an enterprise network, the instructions to:
receive from an enterprise network a set of objects with unknown network reputations, and select from the set an object under analysis;
identify the object under analysis for prioritization;
receive a global uniqueness score for the object, the global uniqueness score comprising a quantitative measure of a degree to which the object under analysis is globally unique;
receive an enterprise uniqueness score for the object, the enterprise uniqueness score comprising a quantitative measure of a degree to which the object under analysis is unique to the enterprise network;
compute a cross-sectional uniqueness score from the global uniqueness score and the enterprise uniqueness score, wherein the cross-sectional uniqueness score varies directly with the global uniqueness score and the enterprise uniqueness score;
assign an analysis priority to the object under analysis according to the cross-sectional uniqueness score, wherein the analysis priority varies directly with the cross-sectional uniqueness score;
analyze, or cause to be analyzed, the set of objects for malicious features, including analyzing the object under analysis according to the analysis priority; and
based on the analysis of the object under analysis, determine whether the object under analysis is an advanced persistent threat (APT) targeted at the enterprise network.

15. The one or more tangible, non-transitory computer-readable media of claim 14, wherein the instructions are further to compute the global uniqueness score, comprising receiving a trained global model $M_{GLOBAL}$ comprising a clustering of global objects, and applying a machine learning algorithm to $M_{GLOBAL}$ and the object.

16. The one or more tangible, non-transitory computer-readable media of claim 15, wherein the instructions are further to compute the enterprise uniqueness score, comprising receiving a trained global model $M_{ENT}$ comprising a clustering of enterprise objects, and applying a machine learning algorithm to $M_{ENT}$ and the object.

17. The one or more tangible, non-transitory computer-readable media of claim 16, wherein computing the enterprise uniqueness score or global uniqueness score comprises applying an extended isolated random forest algorithm.

18. The one or more tangible, non-transitory computer-readable media of claim 16, wherein computing the enterprise uniqueness score or global uniqueness score comprises applying comprises extracting features from the object under analysis.

19. A computer-implemented method of triaging unknown objects for an enterprise network according to a cross-sectional variance score, comprising:
receiving from the enterprise network a large set of objects for security analysis;
receiving a trained global model $M_{GLOBAL}$ comprising a machine learning derived clustering of known global objects according to a machine learning algorithm;
receiving a trained enterprise model $M_{ENT}$ comprising a machine learning derived clustering of known objects for the enterprise network according to the machine learning algorithm;
for individual unknown objects in the large set of objects:
computing a global variance score for the individual unknown object comprising applying the machine learning algorithm to $M_{GLOBAL}$ and the unknown object to provide anomaly detection,
computing an enterprise variance score for the individual unknown object comprising applying the machine learning algorithm to $M_{ENT}$ and the individual unknown object to provide anomaly detection,
computing the cross-sectional variance score from the global variance score and the enterprise variance score, wherein the cross-sectional variance score varies directly with the global variance score and the enterprise variance score;
assigning an analysis priority to the individual unknown object according to the cross-sectional variance score, wherein the analysis priority varies directly with the cross-sectional variance score;
performing detailed analysis of the large set of objects, comprising analyzing individual unknown objects according to the analysis priority assigned to the individual unknown objects; and
upon determining that an individual unknown object is an advanced persistent threat (APT) directed against the enterprise network, warning the enterprise network of the APT.

20. The method of claim 19, wherein the machine learning algorithm is an extended isolated random forest algorithm.

* * * * *